(12) United States Patent
Chen et al.

(10) Patent No.: US 12,535,644 B2
(45) Date of Patent: Jan. 27, 2026

(54) OPTOELECTRONIC DEVICE FOR LIQUID IMMERSION COOLING

(71) Applicant: II-VI Delaware, Inc., Wilmington, DE (US)

(72) Inventors: Fuliang Chen, Shanghai (CN); Shamei Shi, Shanghai (CN); Yandong Mao, Shanghai (CN); William H Wang, Pleasanton, CA (US); Ranran Zhang, Shanghai (CN); Mengfei Zhang, Shanghai (CN)

(73) Assignee: II-VI DELAWARE, INC., Wilmington, DE (US)

(*) Notice: Subject to any disclaimer, the term of this patent is extended or adjusted under 35 U.S.C. 154(b) by 264 days.

(21) Appl. No.: 18/261,088

(22) PCT Filed: Apr. 14, 2023

(86) PCT No.: PCT/CN2023/088289
§ 371 (c)(1),
(2) Date: Jul. 11, 2023

(87) PCT Pub. No.: WO2024/212205
PCT Pub. Date: Oct. 17, 2024

(65) Prior Publication Data
US 2025/0076593 A1 Mar. 6, 2025

(51) Int. Cl.
*G02B 6/42* (2006.01)
(52) U.S. Cl.
CPC ........... *G02B 6/4214* (2013.01); *G02B 6/421* (2013.01); *G02B 6/4257* (2013.01); *G02B 6/4268* (2013.01); *G02B 6/4292* (2013.01)
(58) Field of Classification Search
CPC .. G02B 6/4214; G02B 6/4292; G02B 6/4249; G02B 6/428; G02B 6/4246; G02B 6/32; G02B 6/421; G02B 6/4251; G02B 6/4268
See application file for complete search history.

(56) References Cited

U.S. PATENT DOCUMENTS 10,466,427 B2    11/2019    Wang et al.
10,582,611 B2    3/2020    Hsieh et al.
(Continued)

FOREIGN PATENT DOCUMENTS

CN    106324771 A    1/2017
CN    111433911 A    7/2020
(Continued)

OTHER PUBLICATIONS

Luo, Machine Translation of CN 217181280 U, Aug. 12, 2022. (Year: 2022).*
(Continued)

*Primary Examiner* — Michelle R Connelly
(74) *Attorney, Agent, or Firm* — Blank Rome LLP

(57) ABSTRACT

An optoelectronic device for immersion in a liquid coolant includes a printed circuit board assembly (PCBA) having opposing sides and having an optoelectronic component coupled on one side. A lens block mounted to the side of the PCBA encloses a plenum over the optoelectronic component. An opening defined in the lens block forms a reflective surface. The lens block has a first lens facing the optoelectronic component and opposing the reflective surface. The lens block also has a second lens facing a ferrule, which connects to optical fibers and couples to the lens block. A first seal seals the lens block mounted to the PCBA and separates the plenum from the liquid coolant. An insert is disposed in the opening to protect the reflective surface, and a second seal seals the opening and the insert in the lens block. A third seal seals the ferrule to the lens block.

20 Claims, 3 Drawing Sheets

(56) References Cited

U.S. PATENT DOCUMENTS

| | | | |
|---|---|---|---|
| 11,009,653 B2 | 5/2021 | Clatanoff et al. | |
| 2005/0105857 A1 | 5/2005 | Ishigami et al. | |
| 2008/0226228 A1* | 9/2008 | Tamura | G02B 6/4214 |
| | | | 385/33 |
| 2012/0027364 A1* | 2/2012 | Tamura | G02B 6/4292 |
| | | | 385/88 |
| 2018/0052285 A1* | 2/2018 | Barwicz | G02B 6/3893 |
| 2018/0204783 A1 | 7/2018 | Han et al. | |
| 2022/0350089 A1* | 11/2022 | Puffer | G02B 6/4214 |
| 2023/0393355 A1* | 12/2023 | Zbinden | G02B 6/4278 |

FOREIGN PATENT DOCUMENTS

| | | | |
|---|---|---|---|
| CN | 217181280 U | * | 8/2022 |
| CN | 115524807 A | | 12/2022 |
| CN | 115951459 A | | 4/2023 |
| JP | 2015121670 A | | 7/2015 |
| JP | 2015197643 A | | 11/2015 |
| WO | 2020150551 A1 | | 7/2020 |

OTHER PUBLICATIONS

Burt, Kevin, et al., Design Modifications to an Existing High-Density Mid-Board Optical Engine for Liquid Immersion Cooling, 2019, 3 pages, Abstract only.
Gigalight, Submersible 200G QSFP56 SR4 100m, 2006-2021, 3 pages.
II-VI Delaware, Inc., 100G Parallel MMF 100m QSFP28 with Pigtail Transceiver, 2022, 5 pages.
Kelvion, Data Center Keeping the World Connected, 2017, 15 pages.
Tabbert, Chuck, Fiber Optic Transcievers Status ESA Fiber Optic Workshop, Ultra Communications, Dec. 2015, 28 pages.
"International Search Report issued in PCT/CN2023/088289 on Jan. 15, 2024".

* cited by examiner

OPTOELECTRONIC DEVICE FOR LIQUID IMMERSION COOLING

This application is a U.S. National Stage of International Patent Application No. PCT/CN2023/088289, filed Apr. 14, 2023, which is incorporated by reference in its entirety.

BACKGROUND OF THE DISCLOSURE

Optoelectronic modules are used for optoelectronic communication. Some optoelectronic modules are pluggable so the module can be inserted into and removed from a cage of a host device, such as a host computer, a switching hub, a network router, or a switch box. The optoelectronic module typically communicates with the host device by transmitting and/or receiving electrical data signals to and/or from the host device. The optoelectronic module then communicates data as optical signals along optical cables.

To do the data transmission, the optoelectronic module converts optical signals to electrical signals and converts electrical signals to optical signals. Typically, the optical signals are transmitted through optical fibers connected to the module, and the conversion occurs at a circuit board in the optoelectronic module. An optical interface generally supports one or more optical fibers that communicate the optical data to and from the optoelectronic module, and a lens assembly is used in an optical interface between optical fibers and active optoelectronic components in the modules.

Due to cost, an optoelectronic module is not hermetically sealed so the optical paths in the module are surrounded by air for effective optical coupling. Most optical lens assemblies are designed to operate in air and not in a liquid. However, liquid cooling is an efficient way of cooling and is much better than cooling by air. If liquid should enter an optical path, however, the focal lengths of the optical lens assembly would change due to differences of refractive index between air and liquid. This greatly affects the performance of the optical lens system or even makes the optical lens assembly inoperable.

The subject matter of the present disclosure is directed to overcoming, or at least reducing the effects of, one or more of the problems set forth above.

SUMMARY OF THE DISCLOSURE

An optoelectronic device disclosed herein is used for immersion in a liquid coolant. The optoelectronic device comprises a printed circuit board (PCB) assembly, a lens bloc, a ferrule, and seals. The PCB assembly has first and second opposing sides and has at least one optoelectronic component coupled on the first side. The lens block is mounted to the first side of the PCB assembly and encloses a plenum over the at least one optoelectronic component. The lens block defines an opening forming a reflective surface. The ferrule is connected to optical fibers and is coupled to the lens block.

Of the seals, a first seal seals the lens block mounted to the PCB assembly and separates the plenum from the liquid coolant. A second seal seals the reflective surface in the opening of the lens block from the liquid coolant, and a third seal seals the ferrule to the lens block from the liquid coolant. The seals can comprise an epoxy.

To seal the reflective surface in the opening, an insert or plate can be disposed in the pocket adjacent the reflective surface. The second seal can seal the insert in the opening and can form an air gap between the insert and the reflective surface.

The lens block can have at least one alignment pin adjacent the second lens, and the ferrule can have at least one hole configured to fit on the at least one alignment pin. A fourth seal can seal the at least one hole. A fifth seal can seal process and measurement holes on the lens block.

A method is disclosed herein to assemble an optoelectronic device for immersion in a liquid coolant. The method comprises coupling at least one optoelectronic component on a first side of a printed circuit board (PCB) assembly; mounting a lens block over the at least one optoelectronic component on the first side of the PCB assembly and sealing a plenum between the lens block and the first side of the PCB assembly from the liquid coolant with a first seal; sealing a reflective surface formed in an opening defined on the lens block from the liquid coolant with a second seal; and connecting a ferrule on optical fibers to the lens block by sealing the connection of the ferrule to the lens block from the liquid coolant with a third seal.

The foregoing summary is not intended to summarize each potential embodiment or every aspect of the present disclosure.

DETAILED DESCRIPTION OF THE DISCLOSURE

Figure 1:
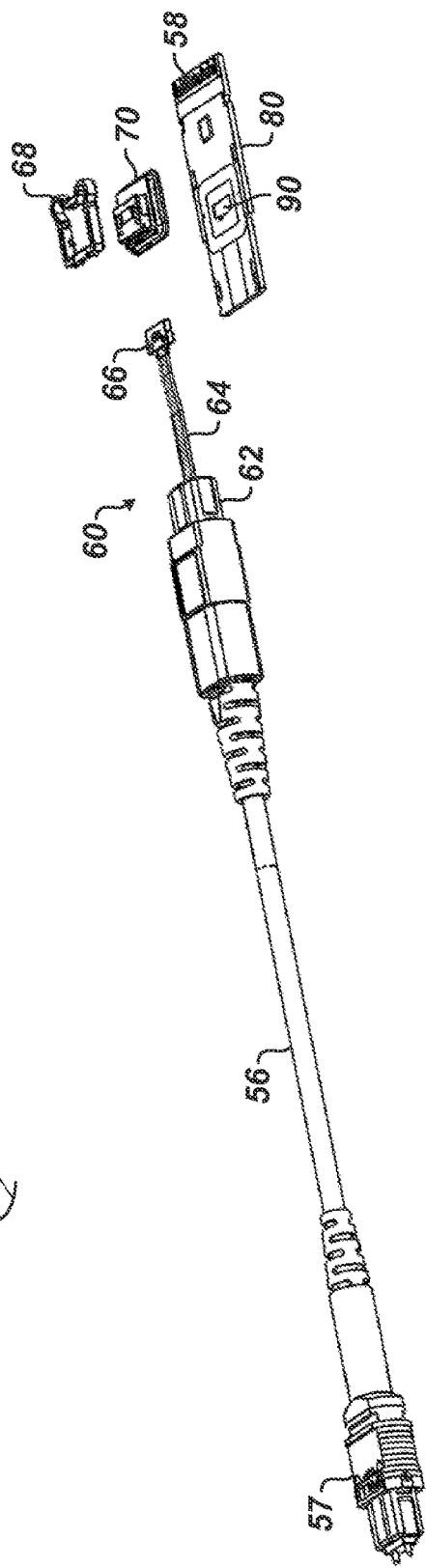
FIG. 1 illustrates an exploded view of an optoelectronic device of the present disclosure.

FIG. 1 illustrates an optoelectronic device 50 of the present disclosure for transmitting and/or receiving optical signals in an optical network and for communicating via electrical signals with a host device (not shown). In general, the optoelectronic device 50 of the present disclosure can be a board-mounted optical assembly (BOA), an optical engine, or a pluggable optoelectronic module for fiber optic communications. For example, the optoelectronic device 50 can be a quad small form-factor pluggable (QSFP+/QSFP-DD) active cable or an optical transceiver.

The optoelectronic device 50 includes a cable 56, a lens block 70, and a printed circuit board assembly (PCBA) 80. As discussed in more detail below, at least a portion of the optoelectronic device 50 is immersible in a liquid coolant used in a liquid cooling system of a data center. Different liquid coolants can be used. For example, water may be used in a single-phase immersion cooling system. Alternatively, an oil can be used in a two-phase immersion cooling system where the evaporated oil is condensed by a condenser.

The cable 56 can be an optical patch cord cable or another type of cable. In this example, one end of the cable 56 has an optical connector 57, which can be placed out of the liquid coolant to connect with other transceivers/systems. The other end of the cable 56 connects with an optical fiber assembly 60 to the lens block 70. The optical fiber assembly 60 has an internal connector 62, a fiber array 64, a ferrule 66.

The PCBA 80 includes an edge connector 58 and has optical circuitry 90 installed therein. The edge connector 58 can electrically connect to a host device (not shown), such as a router, a switch, or the like, for which the device 50 is used. The lens block 70 is mounted on the PCBA 80 and is positioned next to the optical circuitry 90, which is attached to the PCBA 80. The ferrule 66 connects to the lens block 70, and a clip 68 can attach on the lens block 70 to hold the ferrule 66 in place. The clip 68 is designed and used to ensure the accuracy of the alignment.

In general, the optical circuitry 90 includes one or more active optoelectronic components, such as transmitters (lasers) and/or receivers (photodiodes), as well as other necessary components (e.g., amplifiers, digital signal processor, etc.). The lens block 70 mounted to the PCBA 80 adjacent the optical circuitry 90 can route optical signals for the active optoelectronic components to and from the optical fibers of the fiber array 64 and the cable 56.

During operation, outgoing electrical data signals travel via the electronic connector 58 from a host device (not shown). The optical circuitry 90 on the PCBA 80 refines these electrical data signals before passing them along conductive traces (not shown) to the transmitter(s), which convert these electrical data signals into optical data signals before transmitting them through the lens block 70, the fiber array 64, and into the fiber-optic communication cable 56. In this manner, the host device (not shown), into which the optoelectronic device 50 may be positioned, can communicate with a remote system. The transmitter(s) of the optical circuitry 90 may be an array of optical transmitters, such as vertical-cavity surface-emitting lasers (VCSELs) or the like.

In some embodiments, the optical circuitry 90 also includes one or more receiver(s), such as photodiodes, which allow optical signals from the cable 56 to be received and processed. In that case, incoming optical signals traveling along the cable 56 are cooped by the fiber array 64 and ferrule 66 to the lens block 70, which routes the optical signals to one or more receivers of the optical circuitry 90 on the PCBA 80. The optical circuitry 90 converts these optical signals to electrical signals before passing them along conductive traces (not shown) to the edge connector 58. In this manner, the host device (not shown), into which the optoelectronic device 50 may be positioned, can communicate with a remote system.

Figure 2:
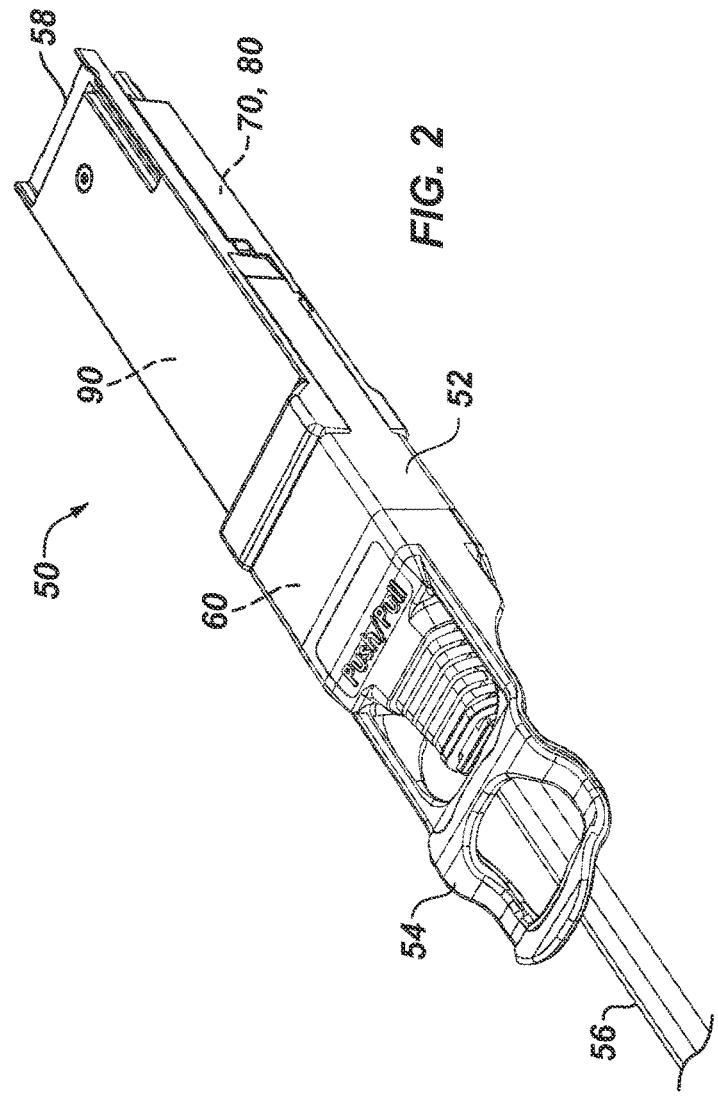
FIG. 2 illustrates a perspective view of the optoelectronic device of FIG. 1 arranged in a housing.

FIG. 2 illustrates one embodiment of the optoelectronic device 50 including a housing 52 for enclosing the optical fiber assembly 60, the lens block 70, the PCBA 80, and the optical circuitry 90. The optoelectronic device 50 shown here can be fixedly attached to the cable 56, and thus the optoelectronic device 50 can represent one end of an "active cable." The other end of the cable 56 can include another optoelectronic module (not shown) attached to the other end of the communication cable 56 or may include a connector (57) as in FIG. 1. The housing 52 can have any standard form factor and can include one or more shells that affix together and enclose the internal components of the device 50. The electronic connector 58 exposed on the housing 52 can be plugged into a router, a switch, or the like.

The optical circuitry 90 is embedded inside the housing 52 of the device 50 to perform the electrical-optical conversions. The optical fiber assembly 60 connects the optical fibers of the cable 56 to the optical circuitry 90 inside the housing 52. The optical fiber assembly 60 is permanently attached inside the housing 52, which results in a protected optical interface. The optical fiber cable 56 connects to the optical fiber assembly 60 and extends from the device 50 for connecting with another device 50 to a remote system.

As an alternative to an active cable, the communication cable 56 can instead be detachably connected to the optoelectronic device 50, in which case the optoelectronic device 50 can function as a stand-alone module. For example, the communication cable 56 can be a fiber-optic ribbon cable, and the communication cable 56 can be terminated at its ends with a multi-fiber push-on (MPO)-style connector. The optoelectronic device 50 can include a corresponding MPO-style connector configured to pluggably connect with the cable's MPO-style connector.

In either case, the communication cable 56 of the device 50 can be a multichannel fiber-optic communication cable that includes a plurality of optical fibers. The optoelectronic device 50 may be configured for optical signal transmission and reception at a variety of per-second data rates and wavelengths known and used in the art. The optoelectronic device 50 may be configured to support various communication protocols known and used in the art, and the optoelectronic device 50 can be compliant with any suitable form factor.

The optoelectronic device 50 can include a pull tab 54 operably connected to a release slide (not labeled) that can collectively be employed to insert the optoelectronic device 50 into a cage of the host device (not shown) and to extract the optoelectronic device 50 from the cage. The housing 52 of the optoelectronic device 50 is not hermetically sealed so the liquid coolant can reach the PCBA 80 and the circuitry 90 inside the device 50. Yet, optical paths inside the device 50 are preferably surrounded by air for effective optical coupling.

Figure 3:
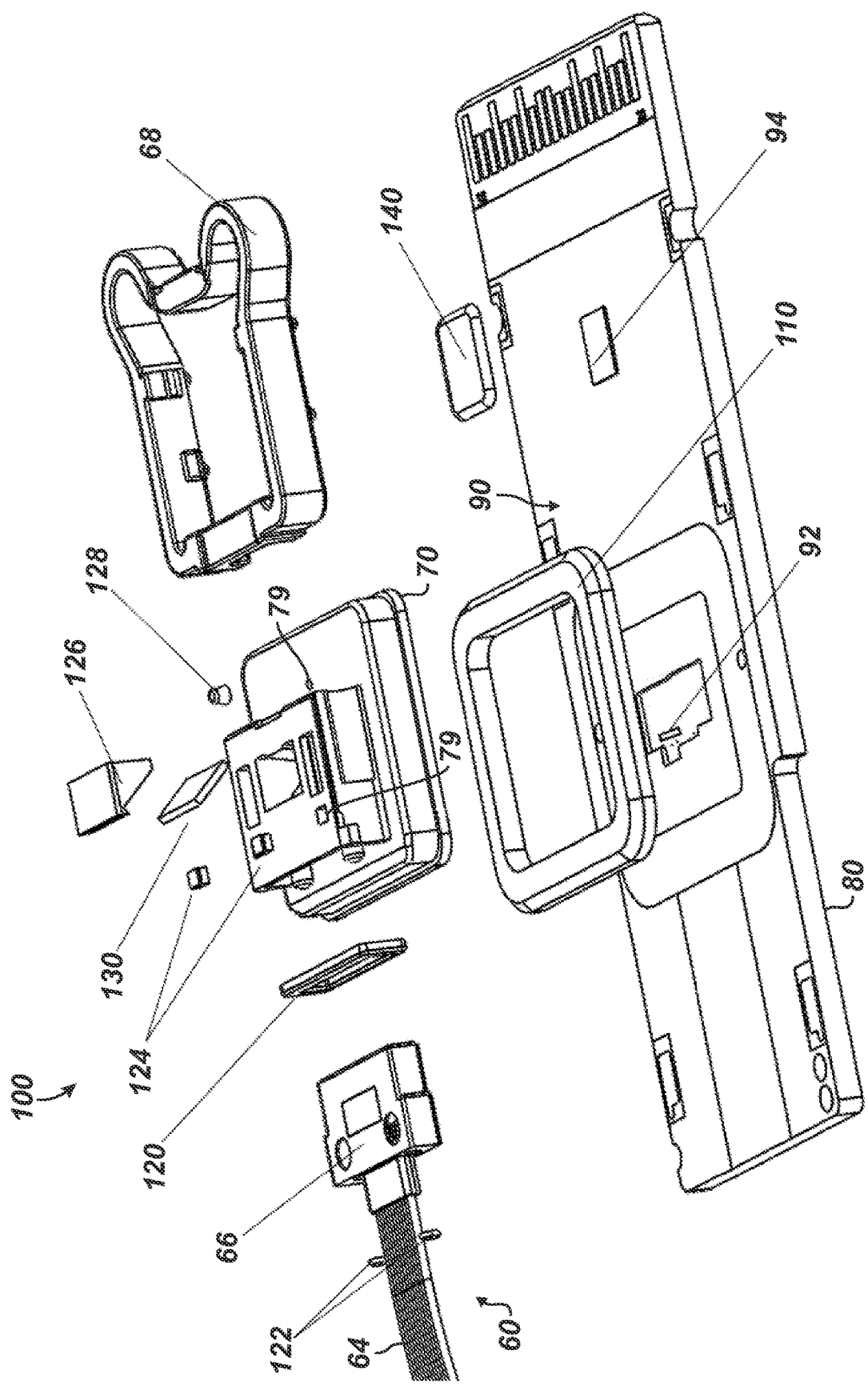
FIG. 3 illustrates the exploded view of FIG. 1 in further detail.
Figure 4:
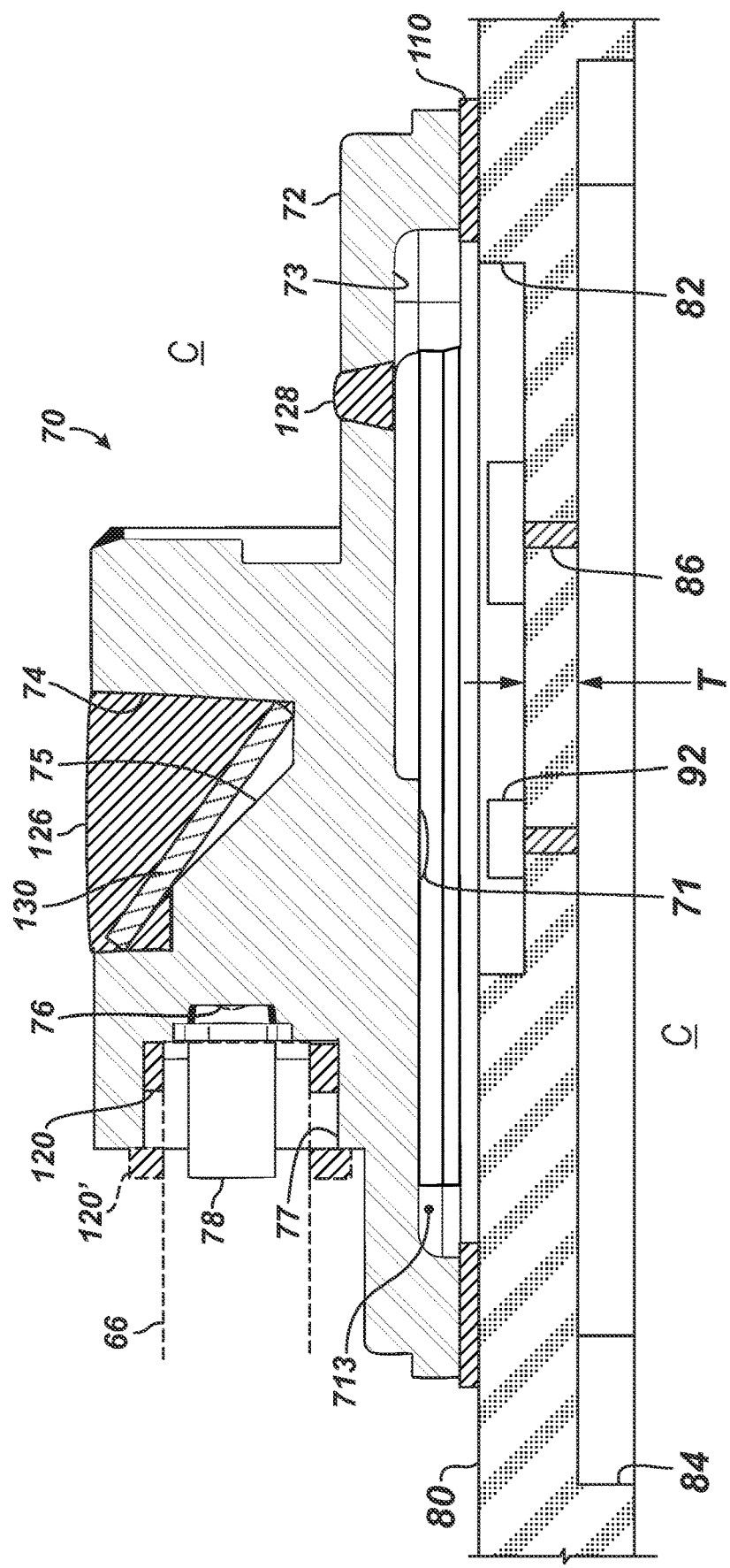
FIG. 4 illustrates a cross-sectional view of a lens block, printed circuit board, and a sealing arrangement of the present disclosure.

Having a general understanding of an optoelectronic device 50 of the present disclosure, the discussion turns to further details of the device 50. FIG. 3 shows an exploded detail view of the optical fiber assembly 60 (fiber array 64 and ferrule 66), the clip 68, the lens block 70, and the PCBA 80. FIG. 4 shows a cross-sectional view of the lens block 70 mounted on the PCBA 80.

The optical fiber assembly 60, the lens block 70, the PCBA 80, and the optical circuitry 90 have a sealing arrangement 100 so the components are capable of being immersed entirely in a liquid cooling system for dissipating produced heat into the surrounding liquid. The sealing arrangement 100 does not affect the optical performance of the lens block 70 and still allows the device 50 to connect to other transceivers/systems outside of the liquid using the optical patch cord cable (56).

The ferrule 66 on the fiber array 64 installs in the lens block 70 and is aligned using alignment pins 78. A seal or gasket 120 can seal the ferrule 66 inside a side pocket 77 of the lens block 70, or the seal or gasket 120' as shown in dashed outline can be disposed outside the side pocket 77 to cover and seal around the opening of the ferrule 66 in the side pocket 77. Protected by the gasket 120/120', an optical lens 76 in the side pocket 77 of the lens block 70 can communicate with the optical fibers of the ferrule 66 without liquid coolant interfering. Holes of the ferrule 66 for the pins 78 are sealed by seals 122 at the end of ferrule 66.

All of the holes 79 of the lens block 70 are also sealed by seals (124, 126, 128). Some of these holes 79 are process and measurement holes used for manufacturing and handling of the lens block 70 during fabrication and assembly so these holes 79 have seals 124, 128 used to seal them after fabrication and assembly. A top opening 74 in the lens block 70 includes a reflective surface 75, which is used to reflect light between opposing lenses 71 and 76 on the lens block 70. This top opening or top pocket 74 is sealed with a seal 126. To protect the reflective surface 75 from contamination and to create an air gap next to the reflective surface 75, an insert 130 is added in the opening 74 between the surface 75 and the seal 126. (Although the insert 130 is shown here as a plate, the insert 130 can have other shapes.) This leaves some air between the insert 130 and the reflective surface 75 that can ensure total reflection of the light inside the lens block 70 when incident on the reflective surface 75.

The lens block 70 has a base 72 that is bonded to the PCBA 80 by an annular seal or gasket 110, and any gaps between the base 72 and the PCBA 80 are sealed with the gasket 120 to prevent liquid coolant from entering in a plenum or space 713 between an underside 73 of the lens block 70 and a top surface of the PCBA 80. The plenum 713 can thereby contain entrapped air during manufacture and assembly. The gasket or seal 120 prevents liquid coolant from entering the plenum 713 affecting the performance of the one or more active optoelectronic components 92, such as transmitters, receivers, and any of the integrated circuits, chips, and other circuitry, disposed on the PCBA 80 and positioned under the lens block 70.

The heat generated by the one or more active optoelectronic components 92 transfers to liquid coolant C through the thermally conductive material in the PCBA 80. To improve the heat transfer, the PCBA 80 may include a recess well 82 on one side to accommodate the one or more active optoelectronic components 92, and an opposing recessed well 84 on the other side of the PCBA 80. The recess well 82 on the side of the PCBA 80 having the lens block 70 communicates with the plenum 713 enclosed by the lens block 70. The wells 82, 84 can bring the surrounding liquid coolant C closer to the one or more active optoelectronic components 92 to be cooled. Additionally, one or more metal heat sinks or thermal vias 86 can be added in the PCBA 80 between the wells 82 and 84 for better thermal dissipation for the components 92. These heat sinks or thermal vias 86 can be composed of copper. As shown in FIG. 3, any other electronic components 94 on the PCBA 80 that are not mounted under the lens block 70 are protected by an encapsulation 140 to isolate them from the surrounding liquid coolant.

The seals 110, 120, 122, 124, 126, 128 disclosed above may include epoxy, sealant, elastomeric seals, or a combination thereof. The encapsulation 140 can also be an epoxy, sealant, elastomeric seals, or a combination thereof. To ensure the reliability of the sealing provided, the seals 120, 122, 124, 126, 128 can be made of various types of materials.

The sealing arrangement 100 disclosed above can isolate the entire optical lens system and components outside of lens block 70 from the liquid coolant, which can effectively prevent the coolant in the liquid system from entering the optical paths, preventing the influence of the coolant on the optical paths and the components, thereby making it possible to cool the optical circuitry 90 in the liquid cooling system.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

What is claimed is:

1. An optoelectronic device for immersion in a liquid coolant, the optoelectronic device comprising:
    a printed circuit board (PCB) assembly having first and second opposing sides and having at least one optoelectronic component coupled on the first side;
    a lens block mounted to the first side of the PCB assembly and enclosing a plenum over the at least one optoelectronic component, the lens block defining an opening forming a reflective surface;
    a ferrule connected to optical fibers and coupled to the lens block; and
    a first seal sealing the lens block mounted to the PCB assembly and separating the plenum from the liquid coolant;
    a second seal sealing the reflective surface in the opening of the lens block from the liquid coolant; and
    a third seal sealing the ferrule to the lens block from the liquid coolant,
    wherein the first side of the PCB assembly defines a first recessed well having the at least one optoelectronic component disposed thereon, the first recessed well communicating with the plenum enclosed by the lens block, and
    wherein the second side of the PCB assembly defines a second recessed well opposing the first recessed well.

2. The optoelectronic device of claim 1, wherein the lens block comprises:
    a first lens facing the at least one optoelectronic component and opposing the reflective surface; and
    a second lens opposing the reflective surface and facing the ferrule.

3. The optoelectronic device of claim 2, wherein the lens block comprises at least one alignment pin adjacent the second lens; and wherein the ferrule comprises: at least one hole configured to fit on the at least one alignment pin; and wherein the optoelectronic device further comprises a fourth seal sealing the at least one hole.

4. The optoelectronic device of claim 3, further comprising a fifth seal sealing process holes and measuring hole on the lens block.

5. The optoelectronic device of claim 4, wherein the first seal, the second seal, the third seal, the fourth seal, and the fifth seal comprise an epoxy.

6. The optoelectronic device of claim 1, further comprising an insert disposed in the opening adjacent the reflective surface, the second seal sealing the insert in the opening and forming an air gap between the insert and the reflective surface.

7. The optoelectronic device of claim 1, further comprising a clip coupling onto the lens block and holding the ferrule to the lens block.

8. The optoelectronic device of claim 1, further comprising a cable connected to the optical fibers of the ferrule.

9. The optoelectronic device of claim 1, further comprising a housing enclosing the PCB assembly, the lens block, and the ferrule.

10. The optoelectronic device of claim 1, wherein the first side of the PCB assembly defines a first recessed well having the at least one optoelectronic component disposed thereon, the first recessed well communicating with the plenum enclosed by the lens block.

11. The optoelectronic device of claim 1, wherein the at least one optoelectronic component comprises an optical transmitter, an optical receiver, or both.

12. The optoelectronic device of claim 1, further comprising:
    at least one electronic component coupled on the PCB assembly outside of the plenum; and
    a fourth seal encapsulating the at least one electronic component.

13. The optoelectronic device of claim 1, wherein the first seal, the second seal, and the third seal comprise an epoxy.

14. A method of assembling an optoelectronic device for immersion in a liquid coolant, the method comprising:
- coupling at least one optoelectronic component on a first side of a printed circuit board (PCB) assembly;
- mounting a lens block over the at least one optoelectronic component on the first side of the PCB assembly and sealing a plenum between the lens block and the first side of the PCB assembly from the liquid coolant with a first seal;
- sealing a reflective surface formed in an opening defined on the lens block from the liquid coolant with a second seal;
- connecting a ferrule on optical fibers to the lens block by sealing the connection of the ferrule to the lens block from the liquid coolant with a third seal;
- forming the first side of the PCB assembly with a first recessed well for the at least one optoelectronic component; and
- forming a second side of the PCB assembly with a second recessed well opposing the first recessed well.

15. The method of claim 14, wherein connecting the ferrule to the lens block comprises fitting at least one hole in the ferrule on at least one alignment pin on the lens block and sealing the fit of the at least one hole on at least one alignment pin from the liquid coolant with a fourth seal.

16. The method of claim 14, wherein sealing the reflective surface from the liquid coolant with the second seal comprises positioning an insert in the opening adjacent the reflective surface; sealing the insert therein with the second seal; and forming an air gap between the insert and the reflective surface.

17. The method of claim 14, wherein connecting the ferrule to the lens block comprising holding the ferrule to the lens block by coupling a clip onto the lens block.

18. The method of claim 14, further comprising enclosing the PCB assembly, the lens block, and the ferrule in a housing.

19. The method of claim 14, further comprising:
- coupling at least one electronic component on the PCB assembly outside of the plenum; and
- encapsulating the at least one electronic component with a fourth seal.

20. The method of claim 14, wherein sealing with the first seal; sealing with the second seal; and sealing with the third seal comprises sealing with an epoxy.

\* \* \* \* \*